United States Patent [19]

Garrett, Jr.

[11] 4,337,228
[45] Jun. 29, 1982

[54] PROCESS FOR THE PRODUCTION OF SULFATES

[75] Inventor: Luther W. Garrett, Jr., San Mateo, Calif.

[73] Assignee: Alumax, Inc., San Mateo, Calif.

[21] Appl. No.: 271,558

[22] Filed: Jun. 8, 1981

Related U.S. Application Data

[63] Continuation-in-part of Ser. No. 181,098, Aug. 25, 1980, abandoned.

[51] Int. Cl.³ .......................... C01F 7/74; C01F 7/76
[52] U.S. Cl. .................................. 423/114; 423/128; 423/132; 423/556
[58] Field of Search ............... 423/111, 114, 128, 132, 423/556

[56] References Cited

U.S. PATENT DOCUMENTS

| | | | |
|---|---|---|---|
| 1,962,498 | 6/1934 | Frost | 423/128 |
| 2,273,930 | 2/1942 | Brown | 423/111 |
| 3,079,228 | 2/1963 | Skay | 423/132 |
| 3,425,802 | 2/1969 | Booth | 423/111 |
| 3,667,905 | 6/1972 | Jennings | 423/556 |
| 4,160,815 | 7/1979 | Huckabay | 423/128 |
| 4,252,776 | 2/1981 | Huckabay et al. | 423/111 |

Primary Examiner—Herbert T. Carter
Attorney, Agent, or Firm—Limbach, Limbach & Sutton

[57] ABSTRACT

A process for commercially producing sulfates useful in the water treatment and papermaking industries from by-product aluminum oxides is taught. The process comprises feeding the aluminum oxide by-product and weak process liquor into digester vessel to form a slurry which is then heated. Sulfuric acid and additional oxide feed is added into the slurry mixture allowing the reaction to go to completion. Specific variables such as temperature, pH, reactant concentrations, reaction times and process liquor recycle are controlled to substantially eliminate certain heavy metals in any form whatsoever from contaminating the final sulfate product.

14 Claims, 4 Drawing Figures

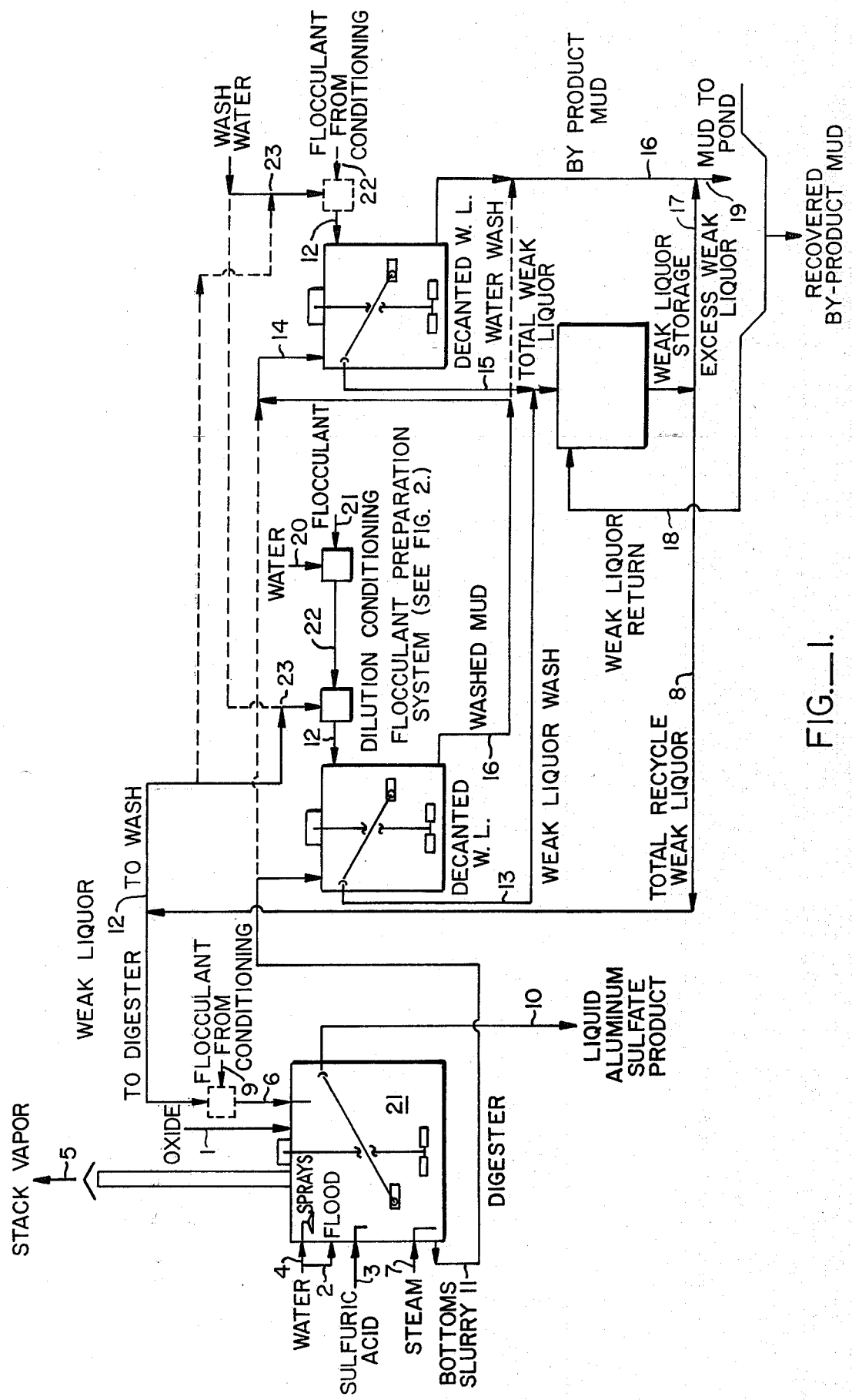
FIG._1.

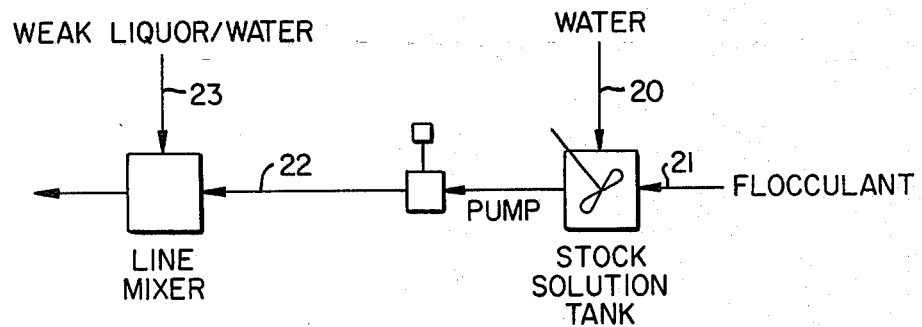
FIG._2.
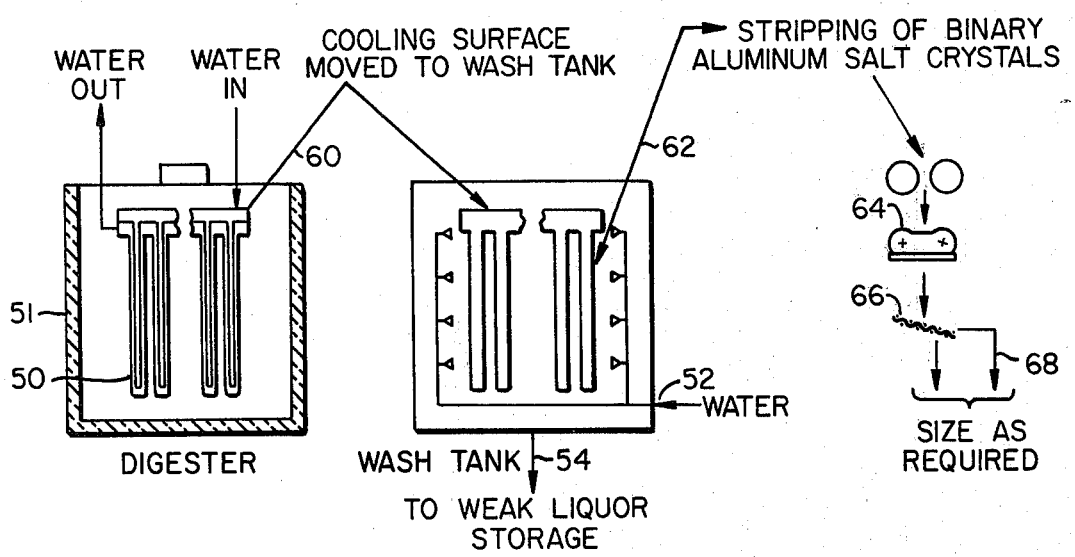
FIG._3.

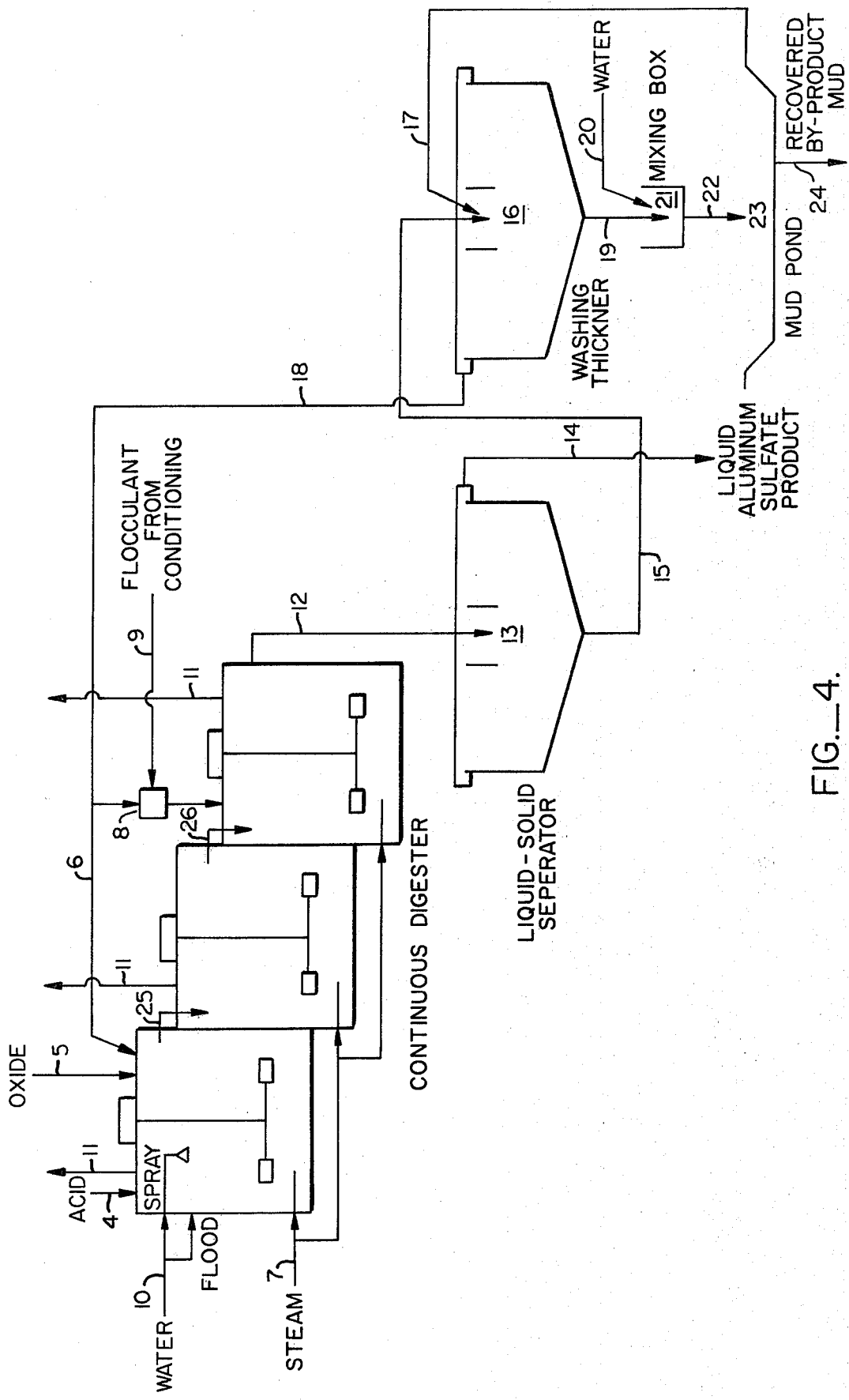
FIG._4.

PROCESS FOR THE PRODUCTION OF SULFATES

RELATED APPLICATIONS

This application is a continuation-in-part of U.S. application Ser. No. 181,098, filed Aug. 25, 1980 now abandoned.

BACKGROUND OF THE INVENTION

This invention relates to a commercial process for the production of sulfates from by-product aluminum oxides.

Commercially produced aluminum is generally derived from two sources. Primary aluminum is obtained from smelting alumina. This process and subsequent remelting and casing operation results in the production of drosses and other by-products which remain high in aluminum content and are a source of secondary aluminum. Processing for recovery of secondary aluminum results in by-product aluminum oxides.

The disposal of these aluminum oxides is a problem of increasing magnitude to the aluminum industry. Usually the aluminum oxide wastes are stockpiled causing mountains of environmental blight and it is an object of this invention to provide a commercially feasible method for disposal of aluminum oxide by-products.

Aluminum sulfates may be produced by the reaction of aluminum oxide and sulfuric acid. The reaction has the equation:

$$Al_2O_3 + 3H_2SO_4 \rightarrow Al_2(SO_4)_3 + 3H_2O$$

In practice it is the hydrated form (the aluminum oxide molecule chemically bonded with one or three molecules of water) that will react with the acid.

Aluminum sulfate compounds have utility in both the production of paper products and the water treatment industry. In the latter industry liquid aluminum sulfate is used as a flocculant and as a clarifier, while in the paper industry it is used to set the sizing agent. Up to now, such high grade aluminum sulfate was derived from commercial bauxite and Arkansas clay which has a high aluminum oxide content. It is, therefore, another object of this invention to conserve natural resources by providing a method for the production of aluminum sulfate of high purity for use in papermaking and water treatment from by-product oxide wastes.

A typical by-product oxide composition would probably contain the following elements in a physical/chemical matrix:

| Element | Wt % |
|---------|------|
| Al | 25–50 |
| Si | 0.5–2.0 |
| Mg | 3–7 |
| Fe | 0.05–2.0 |
| Ca | 0.3–1.0 |
| Ti | 0.06 |
| Zn | 0.1–1.0 |
| N | 0.5–5.0 |
| C | 0.03–0.3 |
| Na | 0.5–2.0 |
| Cu | 0.1–0.5 |
| Mn | 0.1–0.2 |
| K | 0.3–0.7 |
| Cl | 1.0–3.7 |

When sulfuric acid is combined with such a complex by-product composition, there will be a multitude of reactions, some of which will produce sulfates other than aluminum, unless the reaction conditions are strictly controlled. Some of the oxide components will be unreactable.

The major proportion of aluminum available for reaction is found in its oxide form. Under the conditions described in this invention, the hydrated portion of the oxide will react with sulfuric acid according to the previously mentioned equation.

Some of the aluminum is present in the by-product matrix in zero valent form. This elemental form has been found to react with sulfuric acid to form aluminum sulfate, but hydrogen gas, which would be expected as a reaction product if pure metallic aluminum were present, has not been detected in significant quantity. On occasion significant sulfur dioxide has been detected as a reaction product. This latter condition has been reported in the literature according to the equation.

$$2Al° + 6H_2SO_4 \text{ (conc.)} \rightarrow Al_2(SO_4)_3 + 3SO_2 + 6H_2O$$

Aluminum carbide reacts to produce sulfate according to the equation:

$$Al_4C_3 + 6H_2SO_4 \rightarrow 3CH_4 + 2Al_2(SO_4)_3$$

Another reaction which has great commercial utility is that of aluminum nitride. However, the principal object of this invention is the production of aluminum sulfate for use in water treatment and in papermaking which contains reaction products and by-product compounds which are not detrimental to these industries. It was determined that the inclusion of significant amounts of Fe, Mg, Si, Na and K in the aluminum sulfate product does not adversely affect the product when used in the above-recited industries. Inclusion of significant quantities of Cu, Cr, Mn and Pb would, however, effectively remove the reaction product for use in water treatment and papermaking. Thus, the processing steps as described below recite those conditions which convert significant quantities of aluminum sulfate from by-product oxide wastes without the inclusion of toxic heavy metals, such as Cu, Cr, Mn and Pb.

When the aluminum oxide by-products have a high nitride content, the process of this invention can be utilized to produce the binary salt, aluminum ammonium sulfate. The reaction follows the equation:

$$2AlN + 4H_2SO_4 \rightarrow Al_2(SO_4)_3 \cdot (NH_4)_2SO_4$$

Therefore, it is another object of this invention to provide a process to maximize the recovery of the aluminum in the by-product wastes in the form of aluminum sulfate and aluminum sulfate compounds.

SUMMARY OF THE INVENTION

This invention is a process for commercially producing sulfates from by-product aluminum oxides comprising the feeding of the aluminum oxide by-product and weak process liquor into an agitating digester vessel to form a slurry; heating the resulting slurry to a specifically controlled temperature; gradually injecting sulfuric acid and additional oxide feed into the slurry mixture maintaining approximate stoichiometric ratios of acid to oxide; controlling the recycle conditions of the system; allowing the reaction to go to completion; and recovering the product. These various processing conditions will be more fully apparent when considering the appended drawings wherein:

FIG. 1 is a schematic representation of the process of this invention in a batch mode of operation.

FIG. 2 is a detailed schematic drawing of the preparation of the flucculant.

FIG. 3 is a schematic representation of an embodiment of this invention for recovery of a binary salt by crystallization.

FIG. 4 is a schematic representation of the process of this invention in a continuous mode operation.

DETAILED DESCRIPTION OF THE DRAWINGS

In FIG. 1 by-product oxides 1 are batch injected into an agitating digester vessel.

Initially, water is added to the digester to form a slurry. subsequently, the digester 2 would be flooded only in the event of a power failure to prevent solidifying of the mixture caused by rapid cooling.

After initial start-up a weak liquor is produced, internally recycled, and used to form the slurry in the digester. The recycled weak liquor 6 from downstream washing is charged into the vessel. Sulfuric acid 3 is gradually added to the vessel. Excessive foaming is controlled by a water spray 4. Gaseous by-products and water vapor 5 are released through a stack. Oxides and acid are alternately added, keeping a stoichiometric relationship, until a full batch is acquired. If the mixture becomes too acidic, additional oxide 1 is added to the digester vessel. Likewise, if the mixture becomes too basic, additional acid 3 is added to the digester. Additional weak liquor 6 may also be added for dilution purposes.

During the reaction steam may be injected 7 to maintain the reaction temperature. When the reaction has gone to completion, additional weak-liquor 6 is added for dilution to final specific gravity. A flocculating agent 9 is added to the weak liquor stream. Liquid aluminum sulfate product 10 is siphoned off as a clear supernatent.

The remaining bottom slurry 11 is removed to two wash tanks. The contents of each tank are first washed with a weak liquor 12 containing flocculant. The decanted weak liquor 13 is removed to a weak liquor storage tank. The mud in the two tanks is again washed with fresh water containing flocculant. The weak liquor 15 is removed to the weak liquor storage tank and the mud by-product 16 is removed to a mud pond.

FIG. 2 is a detailed schematic drawing of the preparation of the flocculant. Water 20 is added to a tank. Flocculant is conditioned with the water in the tank. The conditioned flocculant 22 is further transferred to another tank where it is diluted with weak liquor and water 23. It is then available for use in the digester and wash stages.

FIG. 3 is a schematic representation of an embodiment of this invention for recovery of a binary salt by crystallization. When the product sought to be recovered is a binary salt of aluminum, it is not siphoned off as in FIG. 1. Instead a cold surface 50 is placed in the hot mixture at the end of the reaction. The product crystallizes on the cold surface. The vessel 51 is insulated to prevent crystals from forming on its surfaces. The cooling surfaces containing the crystals are then removed 60 to a cold water wash.

After washing, the crystals are stripped from the cold surface, sized and packaged for sale. If higher purity product is desired the crystals are redissolved in hot water and recrystallized on the cold surface one or more times depending on the desired purity.

FIG. 4 is a schematic representation of the process of this invention in a continuous mode operation. The process is shown having a three stage digester cycle. Additional digester stages are used if longer reaction times are required.

Concentrated sulfuric acid 4 is continuously fed into the first digester stage. The by-product oxide 5 is also injected into the first stage. As in the batching mode of FIG. 1, recycled weak liquor 6 is added to the digester to form a slurry.

The agitated mixture and resulting slurry is heated by direct steam injection 7 to raise the required temperature range to approximately 140°–160° F. to initiate the reaction.

The partially reacted slurry 25 overflows by gravity into stage 2 of the digester. Due to the exothermic nature of the reaction, additional steam injection is not usually required at this stage of the reaction.

The slurry mixture 26 overflows continuously to stage 3 of the digester. Steam is usually injected 7 in this stage to maintain the temperature for the final reaction.

A flocculant solution 9 is added to the remaining weak liquor 8 which is then added to the digester stage 3 to dilute the product to its required specific gravity.

The completely reacted slurry mixture 12 overflows by gravity to the liquid-solids separator 13. If the desired product is a binary salt, the liquid-solids separator must be insulated as is the digester vessel in FIG. 3. If liquid aluminum sulfate product is the desired product, it is decanted as clear supernatent liquid 14.

If the binary salt is the desired product, the sulfate is exposed to a cooling surface as in FIG. 3. To preserve continuous mode operation a second wash or recrystallization tank is provided so that as one tank fills, sulfate product flow is switched to the alternate tank. Processing is completed as in FIg. 3.

Unreacted solids 15 remaining in the separator flow to a washing thickener 16. Recycled weak liquor 24 from the mud pond is used to wash 17 the unreacted solids in the thickener vessel 16. After settling of the solids, a clear supernatent weak product liquor remains. The weak liquor 18 is recycled to stages 1 and 3 of the digester cycle. The washed unreacted solids 19 are removed to a mixing box 21 where they are mixed with fresh water 20 for a second stage washing to maximize recovery of sulfate values.

The slurry mixture 22 flows the the mud pond 23 from which the by-product mud 24 is recovered. The clear supernatent product which forms on the mud pond flows back to the thickener vessel 16, as described previously.

DESCRIPTION OF THE INVENTION

While aluminum oxide is the predominant compound in the matrix, only a portion of it is available for reacting with sulfuric acid. Aluminum oxides/hydroxides are amphoteric and may either neutralize acids, forming aluminum salts or dissolve in strong bases to form aluminates. Only that portion of the aluminum oxide which can be hydroxylated will be available for the reaction with acid. It is estimated that 62–64% of the total equivalent aluminum oxide can be reacted.

The process of this invention involves carrying out the reaction in a digester vessel operating at atmospheric pressure. Approximately one third batch of the aluminum oxide feed and a proportionate amount of weak liquor is initially charged into the agitating vessel. The resulting slurry is heated by steam injection to a temperature range of approximately 140° F. to 160° F.

Sulfuric acid is gradually injected into the slurry until a stoichiometric ratio of acid to oxide is achieved. The resulting exothermic reaction raises the temperature of the agitated mixture to the approximate boiling point of the solutions or approximately 210° F.–220° F.

It is important that the temperature of the mixture does not exceed approximately 220° F. Temperatures in excess of this is a primary cause of the heavy metals present in the oxide feed, believed to be in their oxide form, to react and contaminate the sulfate product.

Generally, commercial chemical reactions are carried out using an excess of one or more reactants. It has been found that due to the impurity of the aluminum oxide mixture, it is critically important to maintain approximate stoichiometric ratios during the addition of reactants and during the reaction time. This optimizes the reaction which produces aluminum sulfates and minimizes undesirable secondary reactions. Failure to maintain approximate stoichiometric ratios is yet another primary cause of heavy metal contamination. Therefore, when the pH drops below 1.5, indicating excess acid, additional oxide feed and/or weak liquor is charged into the mixture.

After all of the reactants have been added, the agitated mixture is heated, if necessary, to maintain it near its boiling point. Agitation is continued for three to four hours while the reaction goes to completion. The completeness of the reaction is determined by specific gravity and pH measurements. Therefore, a specific gravity measurement of approximately 1.400–1.4700 and a pH of approximately 1.3–1.9 indicates that the reaction has gone to completion (when producing an acidic sulfate product).

At the end of the digestion cycle additional weak liquor will be recycled back to the digester to lower the specific gravity. This will be necessary for two reasons:

1. The maximum amount of product remaining in solution at ambient temperature corresponds to a specific gravity of approximately 1.34.
2. It is desirable to recover the maximum amount of the product from the washing step by recycling the weak liquor for final dilution in the digester. It has been determined that by controlling the temperature of reactants, the ratios of ingredients, extend of recycle and time of reaction (approximately 3 to 5.5 hours with a system operating at atmospheric pressures) a maximum quantity of sulfate can be produced with no appreciable heavy metal contamination.

A flocculating agent is added and the mixture is thoroughly agitated. After ceased agitation the mixture is allowed to settle. If the desired end product is a liquid aluminum sulfate, the clear supernatent liquor is decanted to a product tank.

If dry aluminum sulfate is the desired end product, additional steps are required. At the end of the digestion cycle the liquid aluminum sulfate is charged into an evaporator. The liquor is brought to a boil by steam injection. Heating is continued and the liquid lost to evaporation is replaced with fresh liquor until the temperature reaches 240°–245° F.

The concentrated liquor is transferred through a heated means, such as troughs, to cooling pans. The pans are supported by permit air cooling.

On cooling the content of the pans solidifies. It is then broken up and processed through a series of crushers until the finished product reaches the desired consistency. For example, processing through the first and second crushers reduces the pieces to less than four inches and then three-quarters inches, respectively. The product may be stored at any convenient size and subsequently ground to a finer size. The finished product is screened to commercial specifications. Since novelty does not reside in crystallization, this aspect of the process has not been illustrated.

The slurry remaining on the bottom of the digester after removal of the product contains approximately 23% by weight of unreacted solids. To maximize product recovery and minimize the quantity of waste effluent, the slurry is further processed to recover a weak liquor of the product. This liquor is used primarily as a diluent in the digestion cycle and as a washing medium for the slurry.

The solids are transferred to two wash tanks to recover product liquor which is occluded in the slurry. Washing is done in two stages. In the first washing stage weak liquor is added to the slurry and thoroughly agitated. Flocculation, settlement and decanting follow as in the primary recovery process.

The remaining slurry is again washed following the same procedure with the exception that fresh water rather than weak liquor is used as the washing medium. This second stage effluent washing medium may also be retained if the sulfate concentration as measured by specific gravity remains sufficiently high. It may then be mixed with the first stage effluent washing medium and used for dilution purposes in the digester vessel during the primary reaction stage. The remaining mud is washed out of the tanks to mud ponds.

The optimum recycle ratio of weak liquor to bottom slurry in the first wash stage is in the range of 1.5 to 2.0 volumes of liquor per volume of slurry. In the second wash stage the range is 1.5 to 3.8 volumes of water per volume of weak liquor washed slurry.

Table I summarizes the quantities of reactants, product and by-products and reaction time and temperatures for twelve runs of the process of this invention for the production of aluminum sulfate.

TABLE 1

Summary of Key Data
DIGESTION CYCLE

| | Fresh Feed, lbs. | | | Recycle Weak Liquor, lbs. | | | | Digestion | |
|---|---|---|---|---|---|---|---|---|---|
| Run | Oxide | Acid | Spray Water | During Run | End (Dilution) | Sulfate Product Liquor, lbs. | Mud to Wash Cycle, lbs. | Temp. Max., °F. | Reaction Time, Hrs. |
| 10 | 6.8 | 8.9 | N.A. | 20.3 | N.A. | 47.6 | 11.5 | 212 | 3.3 |
| 11 | 12.5 | 14.6 | N.A. | 22.5 | N.A. | 48.3 | 41.0 | 214 | 4.6 |
| 12 | 9.8 | 13.4 | N.A. | 23.1 | N.A. | 27.2 | 50.8 | 200 | 5.5 |
| 13 | 8.6 | 10.8 | N.A. | 28.5 | N.A. | 46.7 | N.A. | 210 | 4.7 |

TABLE 1-continued

Summary of Key Data
DIGESTION CYCLE

| Run | Fresh Feed, lbs. | | | Recycle Weak Liquor, lbs. | | Sulfate Product Liquor, lbs. | Mud to Wash Cycle, lbs. | Digestion | |
|---|---|---|---|---|---|---|---|---|---|
| | Oxide | Acid | Spray Water | During Run | End (Dilution) | | | Temp. Max., °F. | Reaction Time, Hrs. |
| 14 | 9.0 | 11.1 | N.A. | 35.0 | N.A. | 50.0 | 15.5 | 210 | 4.9 |
| 15 | 12.0 | 14.6 | 8.6 | 30.8 | 26.4 | 56.0 | 14.8 | 200 | 5.5 |
| 16 | 12.2 | 12.6 | 13.0 | 30.8 | N.A. | 26.3 | 37.0 | 212 | 4.5 |
| 17 | 12.5 | 14.9 | 6.5 | 41.1 | 18.2 | 49.9 | (Est.) 42.6 | 210 | 5.5 |
| 18 | 12.5 | 13.1 | 8.6 | 32.0 | 28.3 | 53.2 | 43.7 | 212 | 4.2 |
| 19 | 12.5 | 14.5 | 13.0 | 32.1 | 22.0 | 51.8 | 36.0 | 210 | 5.5 |
| 20 | 12.3 | 13.4 | 10.8 | 31.4 | 17.9 | 44.8 | 32.0 | 210 | 5.0 |
| 21 | 12.0 | 14.5 | 6.5 | 34.5 | 19.7 | 44.5 | 35.5 | 217 | 5.3 |

Table II discloses the percent recovery of products in relation to the total equivalent oxide available in the feed for reacting. Optimal recovery is indicated by a liquor having above 8.0% aluminum oxide concentration which indicates that the liquor is just below the saturation point of the dissolved aluminum sulfate.

The product liquor is analyzed for aluminum sulfate concentration expressed as its percentage aluminum oxide equivalent by complexing the aluminum ion with ethylenedinitrilotetraacetic acid (EDTA), then titrating to determine the excess EDTA. Calibrations are made against a known aluminum sulfate standard.

Table III discloses the weight ratios of the reactants during the digestion cycle and the product properties characterized by density and pH.

TABLE III

DIGESTION CYCLE - OPERATING RATIOS AND LIQUID PRODUCT PROPERTIES

| Run | Weight Ratio | | End of Run Acid/Oxide(Dry) | Heavy Liquor Properties | | | | | |
|---|---|---|---|---|---|---|---|---|---|
| | | | | & Decanting | | | After Dilution | | |
| | Prod. Liq./Oxide(Dry) | Acid/Prod. Liq. | | Density | pH | Temp. °F. | Density | pH | Temp. °F. |
| 10 | 7.4 | 0.19 | 1.4 | | | | 1.304 | | |
| 11 | 4.1 | 0.30 | 1.3 | 1.40 | | 208 | 1.306 | 2.4 | |
| 12 | 3.0 | 0.49 | 1.5 | 1.36 | 2.0 | | 1.304 | 0.7 | |
| 13 | 5.8 | 0.23 | 1.4 | 1.374 | 1.3 | 210 | 1.315 | 2.3 | 150 |
| 14 | 6.0 | 0.22 | 1.3 | 1.46 | 1.5 | 210 | 1.353 | 2.5 | |
| 15 | 5.0 | 0.26 | 1.3 | 1.47 | | | 1.33 | | 140 |
| 16 | 2.3 | 0.48 | 1.1 | 1.44 | 1.8 | 190 | 1.37 | 2.2 | 170 |
| 17 | 4.3 | 0.30 | 1.3 | 1.35 | 1.9 | 200 | 1.336 | 1.9 | 140 est. |
| 18 | 4.5 | 0.25 | 1.1 | 1.44 | 1.6 | 200 | 1.335 | | 149 |
| 19 | 4.4 | 0.28 | 1.2 | 1.40 | 1.3 | 200 | 1.329 | 1.9 | 150 |
| 20 | 3.9 | 0.30 | 1.2 | 1.44 | N.A. | 160 | 1.284 | 2.2 | 100 |
| 21 | 4.0 | 0.33 | 1.3 | 1.48 | N.A. | 192 | 1.37* | N.A. | 130 |

*Later diluted to 1.33 density due to crystallization.

TABLE II

Percent Recovery
Oxide Al$_2$O$_3$ TO HEAVY LIQUOR (SULFATE) PRODUCT

| Run | Heavy Liquor Product | | | Feed Oxide | | Eq. Al$_2$O$_3$ Recovery % |
|---|---|---|---|---|---|---|
| | Liquor, lbs. | Al$_2$O$_3$ (EDTA), % | Eq. Al$_2$O$_3$, lbs. | Oxide lbs. (wet) | Eq. Al$_2$O$_3$ at 52%, lbs. | |
| 10 | 47.6 | 7.41 | 3.53 | 6.8 | 3.54 | 100 |
| 11 | 48.3 | 7.51 | 3.63 | 12.5 | 6.50 | 56 |
| 12 | 27.2 | 7.01 | 1.91 | 9.8 | 5.10 | 37 |
| 13 | 46.7 | 7.82 | 3.65 | 8.6 | 4.47 | 82 |
| 14 | 50.0 | 7.23 | 3.62 | 9.0 | 4.68 | 77 |
| 15 | 56.0 | 7.68 | 4.30 | 12.0 | 6.24 | 69 |
| 16 | 26.3 | 8.26 | 2.17 | 12.2 | 6.32 | 34 |
| 17 | 49.9 | 8.16 | 4.07 | 12.5 | 6.50 | 63 |
| 18 | 53.2 | 8.09 | 4.30 | 12.5 | 6.50 | 66 |
| 19 | 51.8 | 7.97 | 4.13 | 12.5 | 6.50 | 64 |
| 20 | 44.8 | 7.32 | 3.28 | 12.3 | 6.40 | 51 |
| 21 | 51.9 | 8.11 | 4.21 | 12.0 | 6.24 | 68 |

The aluminum sulfate produced by the process of this invention was submitted for testing as a flocculant for water supply treatment to the Los Angeles and Santa Clara, Calif. Water Districts. The water supply treatment industry uses approximately one-third of the commercially available aluminum sulfate. Its drinking water product must meet highest purity standards. Under these rigorous standards, the product performed successfully yielding a treated water product free of any heavy metal contamination from the treatment step. Table IV compares the efficiency of the aluminum sulfate produced by the process of this invention to that of commercially available aluminum sulfate

TABLE IV

PRODUCT EFFICIENCY COMPARISON

| Aluminum Sulfate (ppm) | Treated Water Turbidity[1] | |
|---|---|---|
| | Test Product | Commercial Standard |
| 14.0 | 2.7 | 2.5 |
| 22.0 | 0.16 | 0.16 |

[1]Raw water treated: pH = 7.91; turbidity = 4.7

Table V provides a comparison of water quality treated by the aluminum sulfate produced by the process of this invention to EPA standards.

TABLE V

QUALITY OF WATER TREATED WITH ALUMINUM SULFATE MADE FROM BY-PRODUCT OXIDES

| Element | EPA Limits | Treated Water |
|---|---|---|
| Arsenic | 0.05 | 0.005 |

TABLE V-continued

QUALITY OF WATER TREATED WITH ALUMINUM SULFATE MADE FROM BY-PRODUCT OXIDES

| Element | EPA Limits | Treated Water |
|---|---|---|
| Barium | 1. | 0.03 to 0.08 |
| Cadmium | 0.010 | 0.005 |
| Chromium | 0.05 | 0.01 to 0.02 |
| Lead | 0.05 | 0.04 |
| Mercury | 0.002 | 0.001 |
| Selenium | 0.01 | 0.005 |
| Silver | 0.05 | 0.005 |

The process of this invention may simultaneously be used to recover the binary salt, aluminum ammonium sulfate. Aluminum oxide residue, having a high nitride content, is fed into the digester at a somewhat slower rate than the low nitride reactant. The oxide process weak liquor slurry reacts immediately with the sulfuric acid to evolve ammonia gas. Most of the gas further reacts to form ammonium sulfate which then combines with aluminum sulfate to form aluminum ammonium sulfate.

The process steps are basically the same through the reaction stage for recovery of either liquid aluminum sulfate or the binary salt. However, at the end of the reaction, the salt must be crystallized out of the solution. This is most effectively accomplished by submerging a device having large water cooled surface in the digester vessel. Since the product is only slightly soluble at ambient temperature it crystallizes on the surface. Following removal of the cooling device, the crystals are washed and stripped. The remaining liquor is aluminum sulfate which is processed as described previously.

Crystals prepared according to this method showed a nitrogen content of 3.7%. The theoretical nitrogen content of the double salt hydrate is 3.9%. Greater purity could obviously be obtained by recrystallization.

What is claimed is:

1. A process for producing sulfates from by-product aluminum oxide wherein said sulfates contain no appreciable heavy metals, their oxides or sulfates selected from the group consisting of Cu, Cr, Mn and Pb comprising:
   A. feeding the aluminum oxide by-product and process-weak liquor into a digester vessel to form a slurry;
   B. heating the resulting slurry to an initial temperature between approximately 140° F. to 160° F.;
   C. gradually adding sulfuric acid and additional oxide as needed into the slurry mixture maintaining:
      (1) approximate stoichiometric ratios between the two reactants;
      (2) the specific gravity of the slurry to reach an end point of between approximately 1.400 to 1.4700;
      (3) the pH of the slurry between approximately 1.3 to 1.9; and
      (4) the temperature of the reaction below approximately 220° F.;
   D. continuing to allow the oxides and acid to react for between approximately 3 to 5.5 hours at approximately atmospheric pressure; and
   E. removing the product.

2. The process of claim 1 wherein a flocculating agent is added to the slurry while agitating.

3. The process of claim 1 wherein the reactants are batch injected into the digester vessel.

4. The process of claim 1 wherein excessive foaming during the reaction is controlled by water spraying.

5. The process of claim 1 wherein the reaction mixture is heated by steam injection.

6. The process of claim 1 wherein the product is removed by decanting.

7. The process of claim 6 wherein the slurry remaining in the digester after decanting of the product is processed for recovery of additional product.

8. The process of claim 7 wherein the slurry remaining in the digester vessel is:
A. removed to wash tanks;
B. washed with a weak product liquor followed by agitation, flocculation, settlement and decantation; and
C. separated from the weak process liquor whereupon the remaining slurry is washed with fresh water and the mixture agitated, flocculated, settled and decanted and the wash liquor recovered.

9. The process of claim 8 wherein the weak liquor product is added to the digester vessel for dilution purposes during the initial reaction phase.

10. The process of claim 1 for producing aluminum ammonium sulfate, said process further comprising submerging a device having a cooled surface into the digester vessel onto which the product may crystallize and removing, washing and stripping the crystals.

11. The process of claim 1 wherein the reactants are added and product removed in a continuous mode.

12. A process for producing the binary salt aluminum ammonium sulfate and liquid aluminum sulfate wherein said binary salt contains no appreciable heavy metals, their oxides or sulfates selected form the group consisting of Cu, Cr, Mn and Pb comprising:
A. feeding the aluminum oxide by-product having a high nitride content and process-weak liquor into a digester vessel to form a slurry;
B. heating the resultant slurry to an initial temperature between approximately 140° F. to 160° F.;
C. gradually adding sulfuric acid and additional oxide as needed into the slurry mixture maintaining:
   (1) approximate stoichiometric ratios between the two reactants;
   (2) the specific gravity of the slurry to reach an end point between approximately 1.400 to 1.4700;
   (3) the pH of the slurry between 1.3 to 1.9; and
   (4) the temperature of the reaction below approximately 220° F.;
D. after the reaction has gone substantially to completion, adding flocculant and allowing the mixture to at least partially settle;
E. submerging a device having a cool surface area into the vessel containing the product mixture;
F. crystallizing the binary salt on the cool surface;
G. removing the device having a cool surface and removing, washing and stripping the crystals; and
H. decanting the supernatent liquid aluminum sulfate product liquor.

13. A process for producing sulfates from by-product aluminum oxide wherein said sulfates contain no appreciable heavy metals, their oxides or sulfates selected from the group consisting of Cu, Cr, Mn and Pb by a continuous mode operation comprising:
A. feeding the aluminum oxide by-product and process-weak liquor into a first stage digester vessel to form a slurry;
B. heating the resultant slurry to an initial temperature between approximately 140° F. to 160° F.;

C. continuously feeding sulfuric acid and additional oxide as needed into the first digester stage maintaining:
  (1) approximate stoichiometric ratios between the two reactants;
  (2) the pH of the slurry between approximately 1.3 to 1.9; and
  (3) the temperature of the reaction below approximately 220° F.;
D. providing for gravity overflow into successive digester stages necessary to complete the reaction in approximately 3.0 to 5.5 hours at approximately atmospheric pressure;
E. maintaining the specific gravity of the slurry in the final stage between approximately 1.400 to 1.4700;
F. diluting the product with product liquor;
G. overflowing the slurry mixture to a liquid-solids separator; and
H. decanting the product as a substantially clear supernatent liquid.

14. The process of claim 13 wherein steam is injected in the digester stages if needed to maintain the slurry temperature between approximately 210° F. to 220° F.

* * * * *